Oct. 25, 1927.
F. WEBER
MEASURING DEVICE
Filed Oct. 23, 1926
1,646,567
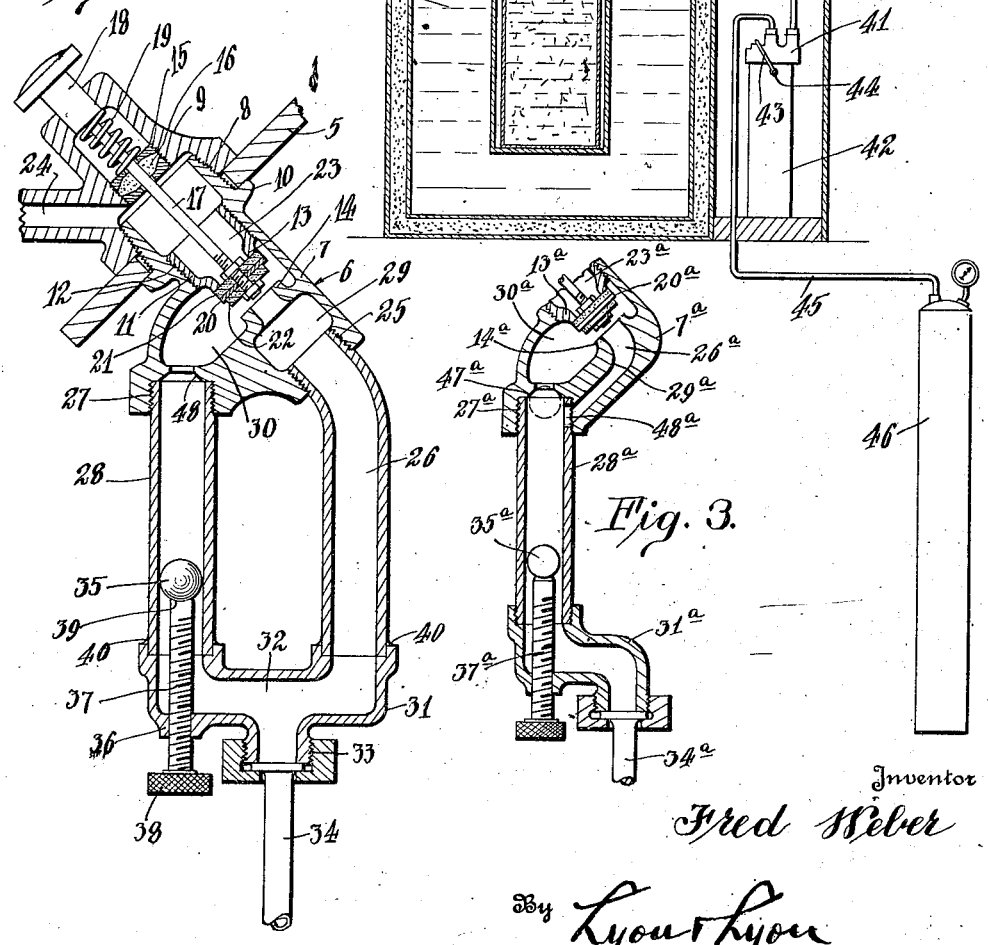
Inventor
Fred Weber
By Lyon & Lyon
Attorneys Patented Oct. 25, 1927.

1,646,567

UNITED STATES PATENT OFFICE.

FRED WEBER, OF LOS ANGELES, CALIFORNIA, ASSIGNOR TO WEBER SHOWCASE & FIXTURE COMPANY, OF LOS ANGELES, CALIFORNIA, A CORPORATION OF CALIFORNIA.

MEASURING DEVICE.

Application filed October 23, 1926. Serial No. 143,691.

This invention relates to a measuring device, and is more particularly related to a measuring valve for measuring liquids under pressure.

The measuring valve embodied in this invention may be used in a number of plates such, for example, as in the measuring of a definite quantity of oil delivered from a storage container under pressure, or in measuring liquids prior to their introduction into containers so that a measured and definite quantity thereof will be positioned within the container such, for example, as the bottling of beverages and the placing in cans of gasoline, or the like, but is more particularly adapted for the measuring of edible syrups for use in the preparation of drinks as they are dispensed at soda fountains.

In the preparation of drinks or beverages at soda fountains, the great variations in the drinks served is occasioned by the wide variations in the quantity of syrup added in the mixing of the drinks.

It is, therefore, an object of this invention to provide a measuring valve for measuring definite quantities of liquid under pressure, and particularly such liquids as syrups as the same are employed in the mixing of beverages.

Another object of this invention is to provide a measuring valve for a measuring chamber in which there is mounted a loosely fitting plunger valve member and which chamber is connected with a source of liquid under pressure, which chamber is provided with a valve controlled outlet, and in which device means are provided for equalizing the liquid pressure above and below the said loosely fitting plunger valve member when the valve outlet is closed, so as to permit the said plunger valve member to fall in the chamber by gravity to a predetermined point.

Other objects and advantages of this invention will be apparent from the following detailed description of a preferred embodiment thereof, as illustrated in the accompanying drawings, in which drawings:

Figure 1 is a sectional end elevation of a soda fountain illustrating a syrup container under pressure and illustrating a measuring valve embodying this invention connected with the syrup under pressure.

Figure 2 is a sectional side elevation of the measuring valve embodied in this invention.

Figure 3 is a fragmental sectional side elevation of a modified form of measuring valve embodying this invention.

In the preferred embodiment of this invention illustrated in the accompanying drawings, 1 designates a soda fountain cabinet which may be of any desired or preferred construction and in which there is preferably mounted a container 2 surrounding which a refrigerant 3 is maintained.

Mounted adjacent and in advance of the cabinet 1 is a counter 4 upon which the mixed beverages are served. Secured preferably to a depending flange 5 of the counter 4 is a measuring valve 6, which measuring valve is preferably of the following construction:

The body 7 is provided with threads 8 at its upper end to which threads 8 a cap member 9 is screw-threaded. The body 7 is formed with a circumferential flange 10 to fit around the bore which is formed in the depending section 5 of the counter 4 so that the cap 9 and flange 10 hold the measuring valve 6 in position. Formed integral with the body 7, or as a separate sleeve 11 which may be screw-threaded as indicated at 12 to the body 7, is a valve seat 13.

Formed immediately below the seat 13 is a second valve seat 14. Screw-threaded within a bore 15 provided in the cap 9 is a packing gland 16 through which a valve stem 17 extends. Secured to the upper end of the valve stem 17 is an actuating head 18, between which actuating head 18 and packing gland 16 a compression spring 19 is mounted. Secured to the end of the rod 17 is a disk 20, upon the opposite face of which washers 21 and 22 are secured. The disk 20 and washers 21 and 22 form a valve head. The compression spring 19 normally holds the valve head on the seat 13 to close the passage 23 formed through the sleeve 11, body 7, and spout 24 of the cap 9. Screw-threaded to the body 7, as illustrated at 25, is a section pipe which provides a liquid pressure chamber. Screw-threaded to the body 7, as illustrated at 27 at a point spaced from the pipe providing the chamber 26, is a section pipe 28 which provides a liquid measuring chamber. Means are provided for connecting the pipes 26 and 28 with a source of liquid under pressure, which means preferably comprises a branch casting 31 which is secured to the lower ends of the pipes 26 and 28 by any suitable means, such as by welding the same thereto, as illustrated at 40. The branch casting 31 is secured in any suitable manner, such as by means of a coupling 33 to the pipe 34 which extends to a source of liquid under pressure.

Mounted within the measuring chamber provided by the pipe 28 is a plunger or loose fitting valve means 35 which is raised by the pressure of the liquid under the same when the valve head is moved to engage the seat 14 and forces a measured quantity of liquid from the measuring chamber 28 and permits leakage of the liquid by the same so that a definite quantity of liquid is discharged from the chamber 28 before this loose fitting valve means engages a seat 48 formed in the body 7 at the top of the measuring chamber 28. In order to permit the discharge of the measured quantity of liquid from the measuring chamber 28, there is provided in the body 7 a passage 30 through which the liquid flows when the valve is moved to engage the seat 14. The passage 30 is, when the valve head is moved to engage the seat 13, in open communication through a passage 29 with the interior of the pressure chamber 26 so that the pressure above and below the loose fitting valve means 35 when the same is seated upon the seat 48 is equalized to permit the valve means 35 to fall back by gravity to a predetermined point in the measuring chamber 28.

Means are provided for adjusting the position to which the valve means 35 falls in the measuring chamber 28 so that the quantity of liquid that will be discharged from the measuring chamber 28 may be regulated and which means are preferably of the following construction:

Screw-threaded in a boss 36 formed on the member 31 is a screw 37 having an operating head 38. The screw 37 at its upper end, in the particular embodiment of the invention illustrated in the drawings, is cupped as illustrated at 39, to provide a seat for the valve means 35. The valve means 35 preferably comprises a ball which is of less exterior diameter than the interior diameter of the pipe which forms the chamber 28. When the valve embodying this invention is employed for the discharge of measured quantities of syrup, the conduit 34 extends downward from the counter 4 through a cap 41 which may be of any desired or preferred construction, to a point near the bottom of a container 42 in which the syrup to be measured and dispensed is contained. The cap 41 may be secured to the upper end of the container 42 by any suitable means, such for example as a pivot yoke 43 which is pivotally secured to the container 42 by any suitable means such as illustrated at 44. A conduit 45 is secured to the cap 41 in communication with the interior of the container 42 and extends downward to a source of gas under pressure such as the gas drum 46 so that a gas pressure is maintained on the surface of the liquid within the container 42. In the particular case of dispensing syrup at a soda fountain, I have found that it is advantageous to employ carbon dioxide in the drum 46 as the carbon dioxide tends to maintain the syrup within the container 42 sweet.

In the modified form of measuring valve illustrated in Figure 3, the body $7^a$ is secured to the measuring chamber member $28^a$ at threads $27^a$ and there is formed in the body member $17^a$ a by-pass port $29^a$ which communicates through a port $48^a$ with the interior of the measuring chamber member $28^a$ below the plunger or valve member $35^a$ when the same is seated upon the seat $47^a$. The pressure chamber $26^a$ is provided by the continuation of the port $29^a$ below the valve seat $14^a$ upon which the valve member $20^a$ seats. The measuring chamber provided by the measuring chamber member $28^a$ is provided with fluid under pressure from a conduit $34^a$ which extends to a source of liquid under pressure similar to that to which the conduit $34^a$ extends. A coupling member $31^a$ connects the member $28^a$ with the conduit $34^a$ and a valve adjusting device $37^a$, similar to the adjusting device provided in the modification of this invention shown in Figure 2, is screw-threaded into the coupling member $31^a$.

In the operation of the modified form of this invention, the liquid under pressure admitted from the conduit $34^a$ into the measuring chamber passes by the valve member or plunger $35^a$ and fills the measuring chamber and likewise fills the pressure chamber $26^a$ and the passage $30^a$ when the valve member $20^a$ is seated upon the seat $13^a$. When the valve member $20^a$ is actuated to move the same against the seat $14^a$, the liquid under pressure passes by and carries with it the valve member $35^a$, discharging a measured quantity of liquid from the measuring chamber through the passage $30^a$ and through the passage $23^a$ to the spout. When the valve member $35^a$ engages the seat $47^a$, the further discharge of the liquid is prevented and the pressure upon the opposite sides of the valve member $35^a$ is exercised by the passage of the liquid under pressure through the ports $48^a$, $29^a$ and into the passage $30^a$ so that the valve member or plunger $35^a$ falls by gravity to the lower position in the measuring chamber to engage the adjustment device $37^a$. The plunger or valve member $35^a$ loosely fits within the measuring chamber member $28^a$ so as to permit a definite flow of liquid past the same and also so as to permit the said plunger 35ª to fall freely back to the lower position when a predetermined quantity of liquid has passed through the measuring device.

Having fully described preferred embodiments of my invention, it is to be understood that I do not wish to be limited to the exact details herein set forth which may obviously be varied without departing from the spirit of my invention, as set forth in the appended claims.

I claim:

1. A measuring valve comprising a chamber, a valve member loosely mounted in the chamber, means for connecting the chamber below the said valve member with a source of liquid under pressure, a valve controlled outlet from the said chamber above the said valve member, and means for equalizing the liquid pressure above and below the said valve member when the said valve is closed.

2. A measuring device comprising a measuring chamber, a loose fitting valve member in the said chamber, means connecting the chamber with a source of liquid under pressure, a pressure chamber, means connecting the said pressure chamber and measuring chamber above the said valve member, and valve means for closing the said connecting means and opening a discharge outlet from said measuring chamber.

3. In a measuring chamber, the combination of a measuring chamber, a loose fitting valve member mounted to move vertically in said chamber, means for connecting the said chamber with a source of liquid under pressure, a valve for controlling an outlet from said chamber, and means for equalizing the liquid pressure above and below said valve member to permit the same to fall by gravity.

4. In a measuring valve, the combination with a measuring chamber, a loose fitting plunger valve member mounted in the said chamber, means for connecting said chamber below the said plunger valve member with a source of liquid under pressure, means for opening an outlet from said chamber, and means for equalizing the pressure above and below the said valve member when the said outlet is closed to permit the said plunger valve member to fall.

5. In a measuring valve, the combination with a measuring chamber, a loose fitting plunger valve member mounted in the said chamber, means for connecting said chamber below the said plunger valve member with a source of liquid under pressure, means for opening an outlet from said chamber, means for equalizing the pressure above and below the said valve member when the said outlet is closed to permit the said plunger valve member to fall, and adjustable limit stop means in the said chamber by which the said plunger valve member is stopped.

6. A measuring valve comprising a chamber, a ball valve loosely mounted in said chamber, means for connecting the said chamber below the said ball valve with a source of liquid under pressure, a valve controlled outlet from the said chamber and above the said ball valve, and means for equalizing the liquid pressure above and below the said ball valve when the said valve is closed.

7. A measuring valve comprising a body, a pipe forming a measuring chamber connected with the said body, a plunger valve member loosely mounted in the said chamber, means connecting the said pipe below the plunger valve member with a source of liquid under pressure, a pressure chamber formed in the said body, means for equalizing the pressure in the pressure chamber and measuring chamber, and a valve controlled outlet from the said body.

Signed at Los Angeles, California, this 8th day of October, 1926.

FRED WEBER.